United States Patent
Lai et al.

(10) Patent No.: US 8,778,824 B2
(45) Date of Patent: Jul. 15, 2014

(54) AGGREGATES OF SMALL CRYSTALLITES OF ZEOLITE Y

(75) Inventors: Wenyih Frank Lai, Bridgewater, NJ (US); Robert E. Kay, Easton, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 185 days.

(21) Appl. No.: 13/412,783

(22) Filed: Mar. 6, 2012

(65) Prior Publication Data

US 2013/0029833 A1 Jan. 31, 2013

Related U.S. Application Data

(63) Continuation-in-part of application No. 13/041,597, filed on Mar. 7, 2011.

(60) Provisional application No. 61/512,042, filed on Jul. 27, 2011.

(51) Int. Cl.
  *B01J 29/08* (2006.01)
  *B01J 29/06* (2006.01)
  *B01J 29/10* (2006.01)
  *B01J 29/12* (2006.01)

(52) U.S. Cl.
  USPC .............. 502/79; 502/60; 502/64; 502/66; 502/71; 423/700; 423/716

(58) Field of Classification Search
  USPC .............. 208/46, 106, 108, 109, 110, 111.01, 208/111.25; 502/60, 64, 66, 71, 79; 585/648, 653; 423/700, 716
  See application file for complete search history.

(56) References Cited

U.S. PATENT DOCUMENTS

| 3,293,192 A | 12/1966 | Maher et al. |
| 3,343,913 A | 9/1967 | Robson |
| 3,354,078 A | 11/1967 | Miale et al. |
| 3,402,996 A | 9/1968 | Maher et al. |

(Continued)

FOREIGN PATENT DOCUMENTS

| GB | 1058188 | 2/1967 |
| GB | 1061847 | 3/1967 |
| JP | 53101003 | 9/1978 |
| NL | 7604264 | 4/1976 |

OTHER PUBLICATIONS

G.T. Kerr, "Hydrogen Zeolite Y, Ultrastable Zeolite Y, and Aluminum-Deficient Zeolites"—Chapter 19 in W. Meier, et al. Advances in Chemistry, American Chemical Society, Washington, DC, 1973.

(Continued)

*Primary Examiner* — Walter D Griffin
*Assistant Examiner* — Derek Mueller
(74) *Attorney, Agent, or Firm* — Chad A. Guice (57) ABSTRACT

This invention relates to aggregates of small primary crystallites of zeolite Y that are clustered into larger secondary particles. At least 80% of the secondary particles may comprise at least 5 primary crystallites. The size of the primary crystallites may be at most about 0.5 micron, or at most about 0.3 micron, and the size of the secondary particles may be at least about 0.8 micron, or at least about 1.0 μm. The silica to alumina ratio of the resulting stabilized aggregated Y zeolite may be 4:1 or more.

17 Claims, 4 Drawing Sheets

(56) References Cited

U.S. PATENT DOCUMENTS

| | | |
|---|---|---|
| 3,442,795 A | 5/1969 | Kerr et al. |
| 3,493,519 A | 2/1970 | Kerr et al. |
| 3,506,400 A | 4/1970 | Eberly, Jr. et al. |
| 3,516,786 A | 6/1970 | Maher et al. |
| 3,591,488 A | 7/1971 | Eberly, Jr. et al. |
| 3,640,681 A | 2/1972 | Pickert |
| 3,690,823 A | 9/1972 | Young |
| 3,691,099 A | 9/1972 | Young |
| 3,808,326 A | 4/1974 | McDaniel et al. |
| 3,836,561 A | 9/1974 | Young |
| 3,864,282 A | 2/1975 | Young |
| 3,937,791 A | 2/1976 | Garwood et al. |
| 4,093,560 A | 6/1978 | Kerr et al. |
| 4,218,307 A | 8/1980 | McDaniel |
| 4,273,753 A | 6/1981 | Chang |
| 5,531,808 A | 7/1996 | Ojo et al. |
| 5,620,590 A | 4/1997 | Absil et al. |
| 5,779,992 A * | 7/1998 | Higashi .................. 422/618 |
| 5,849,258 A | 12/1998 | Lujano et al. |
| 5,902,564 A | 5/1999 | Lujano et al. |
| 5,993,773 A | 11/1999 | Funakoshi et al. |
| 6,284,218 B1 | 9/2001 | Kuvettu et al. |
| 6,306,363 B1 | 10/2001 | Funakoshi et al. |
| 6,746,659 B2 | 6/2004 | Pinnavaia et al. |
| 2003/0044350 A1 | 3/2003 | Lam et al. |
| 2004/0138051 A1 | 7/2004 | Shan et al. |
| 2005/0239634 A1 | 10/2005 | Ying et al. |
| 2007/0244347 A1 | 10/2007 | Ying et al. |
| 2008/0138274 A1 | 6/2008 | Garcia-Martinez |
| 2008/0214882 A1 | 9/2008 | Pinnavaia et al. |
| 2009/0029847 A1 | 1/2009 | Euzen et al. |
| 2009/0090657 A1 | 4/2009 | Ying et al. |
| 2010/0147747 A1 | 6/2010 | Elia et al. |

OTHER PUBLICATIONS

Letter to the Editors, "Superactive Crystalline Aluminosilicate Hydrocarbon Catalysts", Journal of Catalysis, 4, 1965, pp. 527-529.

H. Julide Koroglu, et al., "Effects of low-temperature gel aging on the synthesis of zeolite Y at different alkalinities", Journal of Crystal Growth, 241, 2002, pp. 481-488.

C. Berger, et al., "The synthesis of large crystals of zeolite Y revisited", Microporous and Mesoporous Materials, 83, 2005, pp. 333-344.

J. N. Miale, et al., "Catalysis by Crystalline Aluminosilicates IV. Attainable Catalytic Cracking Rate Constants, and Superactivity", Journal of Catalysis, 6, 1966, pp. 278-287.

2510740, DW, C2, Sep. 30, 1976, BASF AG.

C. T. Campbell, et al., "The Adsorption, Desorption, and Reactions of CO and O2 on Rh2", Journal of Catalysis, 54, 1978, pp. 289-302.

K. Rajagopalan, et al., "Influence of Zeolite Particle Size on Selectivity During Fluid Catalytic Cracking", Applied Catalysis, 23, 1986, pp. 69-80.

D. H. Olson, et al., "Chemical and Physical Properties of the ZSM-5 Substitutional Series", Journal of Catalysis, 61, 1980, pp. 390-396.

Shigeo Miwa, editor, "Powder Engineering Theory", 1981, Nikkan Kogyo Shinbun KK, pp. 1-31.

* cited by examiner

AGGREGATES OF SMALL CRYSTALLITES OF ZEOLITE Y

CROSS-REFERENCE TO RELATED APPLICATION

This application is a continuation-in-part of U.S. Non-Provisional application Ser. No. 13/041,597 filed Mar. 7, 2011 and claims priority to U.S. Provisional Application Ser. No. 61/512,042 filed Jul. 27, 2011, which are herein incorporated by reference in their entirety.

FIELD

This invention relates to aggregates of small crystallites of zeolite Y. Small primary crystallites of zeolite Y can cluster into larger secondary particles, at least 80% of which may comprise at least 5 primary crystallites. These secondary particles may have an essentially spherical (e.g., round) morphology and high mesopore surface area. When the outer surfaces of the secondary particles are viewed, e.g., in a SEM image, the average size (width/diameter) of the primary crystallites may be about 0.5 μm or less, though the average size of the secondary particles may be about 0.8 μm or more. The silica to alumina ratio of the resulting highly aggregated zeolite Y products may be 4:1 or more. Methods for making the aggregates of Y crystals are also disclosed. The aggregates may be used as sorbents, catalysts, and/or catalyst supports.

BACKGROUND

Zeolite Y, a member of the Faujasite family, is widely used in many catalytic processes such as fluid catalytic cracking (FCC), hydrocracking, aromatics alkylation, and aromatics transalkylation. A particular type of zeolite Y is known as ultra-stable Y zeolite (USY). Typical USY has crystal morphology of non-aggregated and submicrosized crystals and may contain intra-crystal mesopores after post-treatment involving high temperature steaming. The individual submicrosized crystals may have crystal defects which produce variously oriented crystal grains within an individual crystal particle. U.S. Pat. No. 6,284,218 states that such defects include stacking faults and screw defects.

When heavy molecules are catalytically processed, such as in catalytic cracking of heavy gas oil, transport properties (both intra-particle and inter-particle) of the catalyst are important, in order to operate outside of the diffusion limited regime that often leads to coking.

The article by K. Rajagopalan et al., "Influence of Zeolite Particle Size on Selectivity During Fluid Catalytic Cracking", Applied Catalysis, 1986, 23, 69-80, reports that smaller particle size NaY zeolite fluid catalytic cracking (FCC) catalysts exhibited improved activity and selectivity to intermediate cracked products, such as gasoline and light cycle oil. Selectivity differences were said to be explained by considering the effect of diffusion resistance on the rate constants for cracking of gas oil and gasoline.

U.S. Pat. No. 5,620,590 reports that small crystal zeolite Y of less than 1 micron shows activity benefit in hydrocracking compared to larger crystals. However, small crystal zeolites often present problems in manufacturing (e.g., difficulties in filtration and formulation) due to their small particle sizes and low bulk density. Therefore, it is desirable to have zeolites that possess the performance advantages of small particles, while still maintaining the easy processability of large particles. Thus, one ideal zeolite morphology includes large secondary particles (often greater than 1 micron) formed by agglomeration of smaller primary crystallites (often less than, or even much less than, 1 micron). Furthermore, to improve mass transportation rates, zeolite crystals with small size or aggregated crystals containing inter-crystal mesopores can be desirable, e.g., for reducing diffusion limitations.

Conventional zeolite Y tends to have a crystal or primary crystallite size of much greater than 0.1 μm, even greater than 1 μm. Examples of such conventional forms of zeolite Y include U.S. Pat. Nos. 3,343,913, 3,690,823, and 3,808,326, for example.

Small crystal size zeolite Y may be prepared by methods disclosed in U.S. Pat. Nos. 3,516,786 and 3,864,282.

Zeolite X, zeolite Y, and natural faujasite have identical structure types and differ only in the ratio of silica to alumina in the final crystal structure. For example, zeolite X is generally referred to as having an $Si/Al_2$ molar ratio of 2-3, whereas zeolite Y is generally referred to as having an $Si/Al_2$ molar ratio of 3-7.

U.S. Pat. Nos. 5,993,773 and 6,306,363 describe various forms of low-silica faujasite zeolite, referred to as LSX, having silica to alumina molar ratios of 1.9-2.1. These patents include SEM photographs showing LSX zeolite particle size and morphology.

In U.S. Pat. No. 6,306,363, it is stated that, when zeolites are observed by a SEM, they may be visible either (1) in the form of non-aggregated primary crystallites only, which are the smallest units of zeolite particles, or (2) in the form of secondary particles which are formed by agglomeration of a plurality of primary crystallites. Primary crystallites of zeolites may have their shapes predetermined, depending upon the type of zeolite. For example, A-type zeolite tends to have a cubic shape, and faujasite-type zeolite tends to have an octahedral shape or a polyhedral shape developed from a generally spherical shape with some angularity, as shown in FIG. 3 of this patent. However, it is possible for faujasite-type zeolites to have other shapes, such as elongated shapes (e.g., rod-like shapes).

Usually, particle sizes distributions of these particles are roughly symmetric about an average peak maximum. A method for obtaining an average particle size from particles having a distribution is described in detail, for example, at pages 1 to 31 of "Powder Engineering Theory", Shigeo Miwa ed., 1981, Nikkan Kogyo Shinbun K. K. The primary crystallite size of the faujasite-type zeolite may be described as a number average particle size of the primary crystallite particle diameters (observed by SEM) as approximated to spheres, which is called the "projected area diameter" or "Heywood diameter".

LSX in U.S. Pat. No. 6,306,363 is described as being of high purity and characterized in its primary crystallite size of at least 0.05 μm and less than 1 μm, which is said to be a fine (small) size, in comparison with previously known forms of LSX, e.g., where the primary crystallite size is from 3-5 μm, and even more generally where it is at least 1 μm. In this patent, it is stated that, when fine LSX of high purity is used, for example, as an adsorbent of various substances, diffusion into the interior will be facilitated, and improvement in various dynamic properties can be expected.

The LSX described in U.S. Pat. No. 5,993,773 is said to be characterized not only by high purity, but also a peculiar primary crystallite size distribution, wherein the primary crystallite size of a smaller set of particles is from 1-8 μm, the primary crystallite size of a larger set of particles is from 5-15 μm, and 90% or more of the particles are in the smaller set. The right hand portion of FIG. 2 of this patent illustrates a large single crystal or primary crystallite having a spherical polyhedral shape with angularity or edges developed.

SUMMARY

An aggregated form of zeolite Y comprises small primary crystallites and secondary particles of larger size. At least 80%, e.g., at least 90% or at least 95%, of the primary crystallites may be aggregated or clustered to form the secondary particles. The ratio of the average size (width/diameter) of the secondary particles to the average size (width/diameter) of the primary crystallites, when the outer (i.e., external) surfaces of the secondary particles are viewed, may be at least 3:1, for example at least 5:1 or at least 10:1. When the outer surfaces of the secondary particles are viewed, e.g., in an SEM image, the average size of the primary crystallites in a secondary particle may be about 0.5 µm or less, for example about 0.3 µM or less, about 0.2 µm or less, or about 0.1 µm or less, whereas the average size of the secondary particles may be about 0.8 µm or more, for example about 1.0 µm or more or about 2.0 µm or more. At least 80%, e.g., at least 90% or at least 95%, of the aggregated secondary particles may comprise at least 5, for example at least 10, primary crystallites. These primary crystallites and secondary particles as described herein may be observable, e.g., by an SEM under sufficient conditions including appropriate magnification and resolution.

The average sizes of the primary crystallites and secondary particles can be determined, for instance, by viewing one or more sufficient two-dimensional SEM images of the secondary particles and approximating the shape of the primary crystallites and secondary particles roughly as two-dimensional spherical projections (circles). When percentages (e.g., 80%, 90%, 95%, or the like) of primary crystallites and secondary particles are referred to herein, it should be understood that these percentages are based on numbers of these particles. Although SEM images referred to herein do not necessarily depict all of the particles in an entire batch of primary crystallites and secondary particles, it should also be understood that the SEM images referred to herein are viewed as representative of an entire batch of primary crystallites and secondary particles, including even those particles not specifically observed.

DETAILED DESCRIPTION OF THE EMBODIMENTS

Smaller crystallites of zeolite Y can be clustered into discrete, larger particle size bodies. The smaller particle size crystallites are also referred to herein as primary crystallites or primary particles. The clusters of these primary crystallites are also referred to herein as secondary particles, aggregates, and/or agglomerates. In certain cases herein, the zeolite Y can alternately be described as Mesoporous-Y (Meso-Y).

The secondary particles may be essentially uniform in size. For instance, at least 80%, e.g., at least 90% or at least 95%, of the size of the secondary particles may vary on average by no more than 0.5 micron, for example no more than 0.3 micron or no more than 0.1 micron, as observed by SEM, measuring average diameters as approximated using spherical secondary particulate shapes.

As indicated by the spherical approximations for size (width/diameter) determinations, the secondary particles may be essentially spherical in shape. For instance, at least 80%, e.g., at least 90% or at least 95%, of the secondary particles may have an aspect ratio of between 0.7 and 1, for example, between 0.8 and 1. Aspect ratio may be calculated by dividing the shortest cross-sectional dimension of a secondary particle by the longest cross-sectional dimension of the secondary particle, as observed by SEM. The secondary particles may appear as clusters of primary particles, having a broccoli-like morphology/appearance.

The primary crystallites may have a non-spherical shape. For example, the primary crystallites may have a smooth or roughened octahedral shape, which is more or less typical of certain faujasite type zeolite crystals. However, the primary crystallites may have other less common shapes, such as elongated or rod-like shapes.

When secondary particles are viewed, for example using SEM techniques, only the exterior surfaces or shells of the secondary particles are typically visible. Consequently, the entire crystal morphology of the primary crystallites, as well as of the interior of the secondary particles, is not usually observed visually. Accordingly, the secondary particles of the present invention may possess or lack primary crystallites in the interior regions of the secondary particles, which cannot be observed by SEM. Additionally or alternately, some or all of the primary crystallites may or may not be elongated along an axis extending from the center of the secondary particles to the center of the surface of each crystallite, as observed using SEM.

In aggregates of individual primary crystallites, spaces can exist among individual primary crystallites, thus providing pore spaces, especially mesopores. In contrast, stacking faults within an individual crystallite tend not to provide pore spaces. One or more stacking faults may exist within any individual primary crystallite.

The secondary particles may possess an external surface area of 10 m$^2$/g or more, for example, 20 m$^2$/g or more or 40 m$^2$/g or more, especially after undergoing calcination and/or steaming. Conventional forms of zeolite Y, such as those having non-aggregated primary crystallites with a size of 1 micron or more, tend to have an external surface area of less than 10 m$^2$/g. The relatively high external surface area of the secondary particles can be an indication generally of porous gaps between individual primary crystallites, and specifically of mesopores in the internal regions of the secondary particles. A single crystal of comparable size in the form of a generally spherical shape (with angularity or edges developed) would be expected to have a smaller external surface area.

The centers of the secondary particles may, in certain cases, be less dense than the edges of the secondary particles, as measured by SEM or TEM. This lack of density in the centers of the secondary particles can be a further indication that these secondary particles are indeed an aggregation of primary crystallites, rather than a single large crystal.

Elemental mapping of secondary particles may reveal that the Si/Al ratio can be relatively uniform throughout the secondary particles. Such a uniform Si/Al ratio can provide further indication that these secondary particles are indeed an aggregation of primary crystallites, rather than a single large crystal or large particles with an aluminum-, or a silicon-, rich (amorphous) core.

The zeolite Y in the aggregates may have a silica to alumina ($Si/Al_2$) ratio of at least 4 (i.e., at least 4:1), for example of at least 4.5, of at least 5, or from 5 to 6.

The aggregates of zeolite Y may be combined with one or more metal oxide binders (optional) and at least one hydrogenating metal component, in order to form a catalyst suitable for hydrocracking and/or dewaxing. Examples of such hydrogenating metal components can include one or more noble metals or one or more non-noble metals. Suitable noble metals imparting hydrocracking/dewaxing catalyst functionality can include platinum, palladium, and/or other noble metals from Groups 8-10 of the Periodic Table, such as iridium and/or rhodium. Suitable non-noble metals imparting hydrocracking/dewaxing catalyst functionality can include those of Groups 5-7 of the Periodic Table. The Periodic Table used in this specification is the table approved by IUPAC and the U.S. National Bureau of Standards, as shown for instance in the table of the Fisher Scientific Company, Catalog No. 5-702-10. Preferred non-noble metals can include chromium, molybdenum, tungsten, cobalt, nickel, and combinations thereof, such as cobalt-molybdenum, nickel-molybdenum, nickel-tungsten, cobalt-tungsten, cobalt-nickel-molybdenum, cobalt-nickekungsten, nickel-molybdenum-tungsten, and cobalt-molybdenum-tungsten. Non-noble metal components may be pre-sulfided prior to use by exposure to a sulfur-containing gas (such as hydrogen sulfide) or liquid (such as a sulfur-containing hydrocarbon stream, e.g., derived from crude oil and/or spiked with an appropriate organosulfur compound) at an elevated temperature to convert the oxide form to the corresponding sulfide form of the metal. The catalyst may additionally or alternatively be combined with a binder material and used in hydrocracking processes, such as described in U.S. Pat. No. 5,620,590.

The aggregated form of zeolite Y may have a mesopore volume of at least 0.025 cm³/gram (abbreviated cc/g herein), particularly in the inter-crystalline regions of the aggregates. Non-aggregated forms of zeolite Y thus tend to lack mesopores (which are defined herein as pores having a diameter from about 20 to about 300 Angstroms). The unit cell size (UCS) of the zeolite Y can be 25 Angstroms or less, e.g., between 24 and 25 Angstroms.

Small size zeolite Y can be prepared using a reaction mixture containing a source of alumina, a source of silica, a source of sodium ions, a source of water, and optionally a source of hydroxyl ions. Although the reaction mixture is described as containing sources of alumina and silica, it should be understood that these are actually sources of aluminum atoms and silicon atoms, respectively. Nevertheless, since the zeolite Y structure is usually described in terms of oxidized versions of these atoms, and indeed to facilitate the standard characterization of such zeolitic structures with respect to ratios of silica to alumina, and the like, the sources are referred to herein for convenience in their oxidized forms.

Sources of alumina for preparing aggregates of small size zeolite Y can be in the form of a soluble salt, for example a sodium salt of alumina such as commercially available from US Aluminate. Other suitable alumina sources can additionally or alternately include other aluminum salts, such as the chloride, aluminum alcoholates, hydrated aluminas such as gamma alumina, pseudoboehmite, and colloidal alumina, and the like, and combinations thereof.

The silica source for preparing aggregates of small size zeolite Y can be a precipitated silica, such as Ultrasil®, which is commercially available from Evonik Degussa. Other suitable silica sources can additionally or alternately include powdered silica (including precipitated silica, such as Zeosil®, and silica gels), silicic acid, colloidal silica (such as Ludox®), dissolved silica, and the like, and combinations thereof. In the presence of a base, certain silica sources may form silicates. According to certain particular embodiments exemplified herein, a sodium silicate solution can further additionally or alternately be used as a source of silica. Still further additionally or alternately, a precipitated silica (particularly Ultrasil® and/or Sipernat®) can be used as a source of silica. Especially in, but not limited to, situations where a precipitated silica is used as a preferred source of silica, the reaction mixture for forming the aggregates of small size zeolite Y can comprise one or more of a $Si/Al_2$ molar ratio of about 10 or more, an $H_2O/Si$ molar ratio of about 15 or less, and an $OH^-/Si$ molar ratio of about 0.85 or less. Additionally or alternately, the reaction mixture for forming the aggregates of small size zeolite Y may comprise one or more of a silica to alumina molar ratio from about 10 to about 20, an $H_2O/SiO_2$ molar ratio from about 10 to about 20, when hydroxyl ion sources are present an $OH^-/SiO_2$ molar ratio from about 0.5 to about 1.0, and a $Na^+/SiO_2$ molar ratio from about 0.5 to about 1.0.

The thermal and hydrothermal stability of the aggregates of zeolite Y can be improved by removal of aluminum from the aggregates, by steaming, and/or by exchanging cations in the aggregates with yttrium and/or rare earth metal ions, typically lanthanides such as lanthanum and/or cerium, inter alia.

Forms of the present aggregates of zeolite Y, such as the as-synthesized forms, may be subjected to various treatments to remove structural (framework) aluminum therefrom. Many of these techniques rely upon the removal of aluminum from the structural framework of the zeolite by chemical agents appropriate to this end. A considerable amount of work on the preparation of aluminum-deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the method, which are hereby incorporated by reference herein: Catalysis by Zeolites ((International Symposium on Zeolites, Lyon, Sep. 9-11, 1980), Elsevier Scientific Publishing Co., Amsterdam, 1980 (dealuminization of zeolite Y with silicon tetrachloride); U.S. Pat. No. 3,442,795 and Great Britain U.S. Pat. No. 1,058,188 (hydrolysis and removal of aluminum by chelation); Great Britain U.S. Pat. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S.

Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); German Patent No. 2,510, 740 (treatment of zeolite with chlorine or chlorine-contrary gases at high temperatures), Netherlands Patent No. 7,604, 264 (acid extraction), Japanese Publication No. 53,101,003 A (treatment with EDTA or other materials to remove aluminum); and *J. Catalysis,* 54, 295 (1978) (hydrothermal treatment followed by acid extraction), inter alia.

Highly siliceous forms of zeolite Y may be prepared by steaming and/or by acid extraction of structural aluminum, but, because zeolite Y in its usual as-synthesized condition tends to be relatively unstable to acid, it must first be converted to an acid-stable form. Methods for doing this are known, and one of the most common forms of acid-resistant zeolite Y is known as "Ultrastable Y" (USY), e.g., as described in U.S. Pat. Nos. 3,293,192 and 3,402,996 and in Society of Chemical Engineering (London) Monograph Molecular Sieves, page 186 (1968), by C. V. McDaniel and P. K. Maher, each of which are hereby incorporated by reference herein for details of the zeolite and preparation. In general, "ultrastable" refers to Y-type zeolite that is highly resistant to degradation of crystallinity by high temperature and steam treatment and that can be characterized by an $R_2O$ content (wherein R is Na, K, or any other Group 1 metal ion) of less than 4 wt % (for example less than 2 wt %, preferably less than 1 wt %), a unit cell size less than 24.5 Angstroms or less than 24.6 Angstroms, and a silica to alumina mole ratio in the range of 3.5-7 or higher. The ultrastable form of Y-type zeolite can be obtained primarily by a substantial reduction of the alkali metal (Group 1) ion content and of the unit cell size. The ultrastable zeolite Y can be identified both by the smaller unit cell and the low alkali metal content in the crystal structure.

In certain embodiments, the ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 wt %. The base exchanged zeolite can then be calcined at appropriate conditions (e.g., at a temperature from about 540° C. to about 800° C. for up to several hours), cooled, and successively base exchanged again with an aqueous solution of an ammonium salt until the alkali metal content is reduced to less than 1 wt %, which can be followed by washing and calcination again at appropriate conditions to produce an ultrastable zeolite Y. The sequence of ion exchange and heat treatment can result in the substantial reduction of the alkali metal content of the original zeolite and can also advantageously result in a unit cell shrinkage, which (without being bound by theory) is believed to lead to the rather high stability of the resulting Y-type zeolite.

The ultrastable zeolite Y may then be extracted, e.g., with acid, to produce a highly siliceous form of the zeolite. Methods for increasing the silica to alumina ratio of zeolite Y by acid extraction are described, e.g., in U.S. Pat. Nos. 4,218, 307, 3,591,488, and 3,691,099, which are each incorporated herein by reference for details of these methods.

As in the case of many catalysts, it may be desirable to incorporate the present aggregates of zeolite Y with another material, e.g., to impart resistance to the temperatures and other conditions employed in organic conversion processes. Such materials include active and inactive materials, synthetic and/or naturally-occurring zeolites, inorganic materials (such as clays, silica, and/or metal oxides such as alumina), and the like, as well as combinations thereof. The inorganic materials may be either naturally occurring or synthesized by manipulating a precursor form, such as a gelatinous precipitate and/or gel (including mixtures of silica and metal oxides). Use of an active material in conjunction with the molecular sieve produced by the present process (i.e., combined therewith after sieve formation and/or present during sieve synthesis) can tend to change the conversion and/or selectivity of the catalyst in certain organic conversion processes. Inactive materials can suitably serve as diluents, e.g., to control the amount of conversion and/or any undesirable effects of conversion in a given process, so that products can be obtained economically and orderly without employing other means for controlling the rate of reaction. These other materials may be incorporated into naturally-occurring clays (e.g., bentonite, kaolin, or the like, or combinations thereof), e.g., to improve the crush strength of the catalyst under commercial operating conditions. Said materials (i.e., clays, oxides, etc.) can additionally or alternately function as catalyst binders. It can be desirable to provide a catalyst having good crush strength, in order to prevent the catalyst from breaking down into powder-like materials in commercial use. These binder materials have been employed normally only for the purpose of improving the crush strength of the catalyst.

Naturally-occurring clays that can be composited with molecular sieve produced by the present process can include, but are not limited to, the montmorillonite and kaolin families, which include the subbentonites and those kaolins commonly known as Dixie, McNamee, Ga., and/or Florida clays, as well as others in which the main mineral constituent is halloysite, kaolinite, dickite, nacrite, and/or anauxite. Such clays can be used in the raw state, as originally mined or initially subjected to calcination, acid treatment, and/or chemical modification. Binders useful for compositing with molecular can additionally or alternately include inorganic oxides such as silica, zirconia, titania, magnesia, beryllia, alumina, and mixtures thereof.

Additionally or alternately, the aggregated zeolite Y can be composited with a porous matrix material, such as silica-alumina, silica-magnesia, silica-zirconia, silica-thoria, silica-beryllia, silica-titania, ternary compositions (such as silica-alumina-thoria, silica-alumina-zirconia silica-alumina-magnesia, and silica-magnesia-zirconia), and the like, e.g., by extrusion or spray drying methods.

When present, the relative proportions of finely divided crystalline molecular sieve material and binder/matrix component can vary widely, with the zeolite/molecular sieve content ranging from about 1 wt % to about 90 wt %, and more usually, particularly when the composite is prepared in the form of beads, powders, or extrudates, in the range from about 2 wt % to about 80 wt % of the composite. In typical embodiments employing binder, the zeolite/molecular sieve component can be at least 10 wt % of the composite, for example at least 20 wt % or at least 30 wt %.

Additionally or alternately, the present invention can include one or more of the following embodiments.

Embodiment 1

A highly aggregated form of zeolite Y comprising small size primary crystallites of zeolite Y, wherein at least 80% of the primary crystallites are aggregated to form secondary particles, wherein the zeolite has a silica to alumina molar ratio of 4:1 or more (e.g., at least 5:1), wherein an average size of the secondary particles, as viewed from the external surface of the secondary particles, is about 0.8 micron or more (e.g., about 1.0 micron or more), and wherein at least one of the following conditions apply: (a) an average size of the primary crystallites in the secondary particles, as viewed from the external surface of the secondary particles, is about 0.5 micron or less (e.g., about 0.3 micron or less or about 0.2 micron or less); (b) at least 80% (e.g., at least 90%) of the secondary particles comprise at least 5 primary crystallites; and (c) in at least 80% of the secondary particles, a ratio of the average size of the secondary particles to the average size of the primary crystallites is at least 3:1 (e.g., at least 5:1 or at least 10:1).

Embodiment 2

An aggregated form of zeolite Y according to claim 1, wherein said secondary particles are essentially spherical in shape.

Embodiment 3

An aggregated form of zeolite Y according to any one of the previous embodiments, wherein at least 80% of said secondary particles have an aspect ratio between 0.7 and 1.

Embodiment 4

An aggregated form of zeolite Y according to any one of the previous embodiments, wherein the secondary particles have an external surface area of about 10 m$^2$/g or more (e.g., about 20 m$^2$/g or more).

Embodiment 5

An aggregated form of zeolite Y according to any one of the previous embodiments, wherein the secondary particles have central regions and edge regions, and wherein the central regions are less dense than the edge regions, as measured by SEM or TEM.

Embodiment 6

An aggregated form of zeolite Y according to any one of the previous embodiments, wherein Si/Al ratios throughout the secondary particles are approximately uniform, as measured by elemental mapping.

Embodiment 7

An aggregated form of zeolite Y according to any one of the previous embodiments, further comprising at least one hydrogenating metal component.

Embodiment 8

An aggregated form of zeolite Y according to any one of the previous embodiments, having a mesopore volume of at least about 0.03 cc/g.

Embodiment 9

An aggregated form of zeolite Y according to any one of the previous embodiments, wherein said zeolite Y has a unit cell size of about 25 Angstroms or less.

Embodiment 10

An aggregated form of zeolite Y according to any one of the previous embodiments, wherein said zeolite Y is prepared from a reaction mixture in which sodium silicate solution is used as a source of silica.

Embodiment 11

An aggregated form of zeolite Y according to any one of the previous embodiments, wherein said zeolite Y is prepared from a reaction mixture in which a precipitated silica powder is used as a source of silica.

Embodiment 12

A method for making an aggregated form of zeolite Y according to any one of the previous embodiments, said method comprising forming a reaction mixture capable of forming said aggregated form of zeolite Y and maintaining said reaction mixture under conditions sufficient to form said aggregated form of zeolite Y, wherein said reaction mixture comprises sources of $SiO_2$, $Al_2O_3$, $Na^+$, $OH^-$, and $H_2O$, and wherein said reaction mixture comprises an $Si/Al_2$ molar ratio of about 10 or more, an $H_2O/Si$ molar ratio of about 15 or less, and an $OH^-/Si$ molar ratio of about 0.85 or less.

Embodiment 13

An aggregated form of zeolite Y or a method for making an aggregated form of zeolite Y according to any one of embodiments 10-12, wherein said reaction mixture comprises a $SiO_2/Al_2O_3$ molar ratio from about 10 to about 20, an $H_2O/SiO_2$ molar ratio from about 10 to about 20, an $OH^-/SiO_2$ molar ratio from about 0.5 to about 1.0, and a $Na^+/SiO_2$ molar ratio from about 0.5 to about 1.0.

EXAMPLES

Comparative Example 1A

Non-Aggregated NaY Recipe Under Static Conditions

A mixture was prepared from ~885 grams of water, ~262 grams of Ultrasil® silica, ~150 grams of sodium aluminate solution (45% in water), and ~167 grams of 50% sodium hydroxide solution (in water). The mixture had the following molar composition:

| | |
|---|---|
| $SiO_2/Al_2O_3$ | ~10.6 |
| $H_2O/SiO_2$ | ~15.1 |
| $OH^-/SiO_2$ | ~0.76 |
| $Na^+/SiO_2$ | ~0.76 |

Figure 1A:
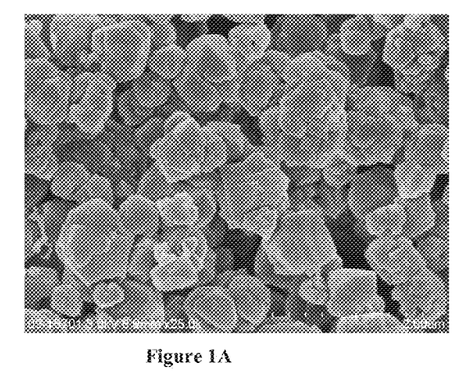
FIGS. 1A & 1B show scanning electron microscope (SEM) images of comparative non-aggregated NaY samples prepared according to Examples 1A & 1B.

The mixture was first aged at room temperature (about 20-25° C.) for about 24 hours, while stirring at ~250 rpm. Then, the aged mixture was reacted at ~200° F. (~93° C.) in a ~2-liter autoclave without stirring for ~24 more hours. The product was filtered, washed with deionized (DI) water, and dried at ~250° F. (~120° C.). The X-ray diffraction pattern (XRD) pattern of the as-synthesized product material showed the typical phase of zeolite Y crystal topology. The SEM image of the as-synthesized product material showed that the material was composed of typical non-aggregated Y crystals, as shown in FIG. 1A. The as-synthesized Y crystals had a $SiO_2/Al_2O_3$ molar ratio of ~5.0 (measured at 4.96).

Comparative Example 1B

Non-Aggregated Nay Recipe with Stirring

A mixture was prepared from ~885 grams of water, ~262 grams of Ultrasil® silica, ~150 grams of sodium aluminate solution (45% in water), and ~167 grams of 50% sodium hydroxide solution (in water). The mixture had the following molar composition:

| | |
|---|---|
| $SiO_2/Al_2O_3$ | ~10.6 |
| $H_2O/SiO_2$ | ~15.1 |
| $OH^-/SiO_2$ | ~0.76 |
| $Na^+/SiO_2$ | ~0.76 |

Figure 1B:
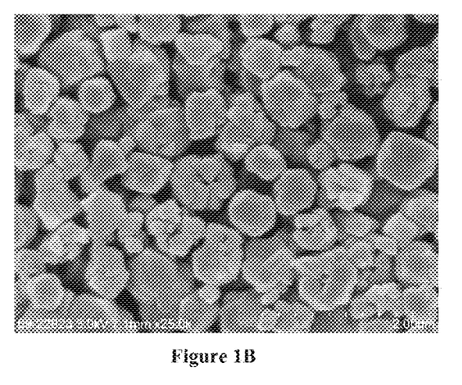

The mixture was first aged at room temperature (about 20-25° C.) for about 24 hours, while stirring at ~250 rpm. Then, the aged mixture was reacted at ~200° F. (~93° C.) in a ~2-liter autoclave, while stirring at ~250 rpm, for ~24 more hours. The product was filtered, washed with deionized (DI) water, and dried at ~250° F. (~120° C.). The X-ray diffraction (XRD) pattern of the as-synthesized product material showed the typical phase of zeolite Y crystal topology with a trace of impurity phase of Gmelinite. The SEM image of the as-synthesized product material showed that the material was composed of typical non-aggregated Y crystals, of the type shown in FIG. 1B. The as-synthesized Y crystals had a $SiO_2/Al_2O_3$ molar ratio of ~5.12. No major differences in crystal size and morphology were observed compared with product of Comparative Example 1A based on the SEM data.

Example 2

Preparation of Aggregated NaY (Meso-Y) Crystals

A mixture was prepared from ~728 grams of water, ~275 grams of Ultrasil® silica, ~166 grams of sodium aluminate solution (45% in water), and ~120 grams of 50% sodium hydroxide solution (in water). The mixture had the following molar composition:

| | |
|---|---|
| $SiO_2/Al_2O_3$ | ~10.1 |
| $H_2O/SiO_2$ | ~12.1 |
| $OH^-/SiO_2$ | ~0.60 |
| $Na^+/SiO_2$ | ~0.60 |

Figure 2:
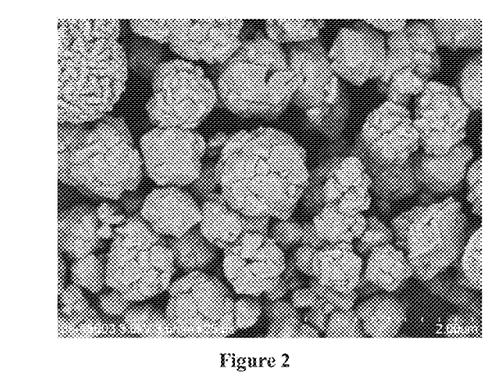
FIG. 2 shows a scanning electron microscope (SEM) image of a sample comprising a mixture of aggregated & non-aggregated NaY prepared according to Example 2.

The mixture was first aged at room temperature (about 20-25° C.) for about 24 hours, while stirring at ~250 rpm. Then, the aged mixture was reacted at ~176° F. (~80° C.) in a ~2-liter autoclave, while stirring at ~250 rpm, for ~192 more hours. The product was filtered, washed with deionized (DI) water, and dried at ~250° F. (~120° C.). The X-ray diffraction (XRD) pattern of the as-synthesized product material showed the typical phase of zeolite Y crystal topology with a very small trace of impurity phase of Gmelinite. The SEM image of the as-synthesized product material showed that the material was composed of aggregates of small crystals and non-aggregated crystals, as shown in FIG. 2. The as-synthesized Meso-Y crystals had a $SiO_2/Al_2O_3$ molar ratio of ~5.54 and a unit cell size (UCS) of approximately 24.61 Angstroms.

Example 3

Preparation of Non-Aggregated NaY Crystals from Diluted Reaction Mixture

A mixture was prepared from ~1000 grams of water, ~129 grams of Ultrasil® silica, ~49 grams of sodium aluminate solution (45% in water), and ~105 grams of 50% sodium hydroxide solution (in water). The mixture had the following molar composition:

| | |
|---|---|
| $SiO_2/Al_2O_3$ | ~16.2 |
| $H_2O/SiO_2$ | ~31 |
| $OH^-/SiO_2$ | ~0.82 |
| $Na^+/SiO_2$ | ~0.82 |

Figure 3:
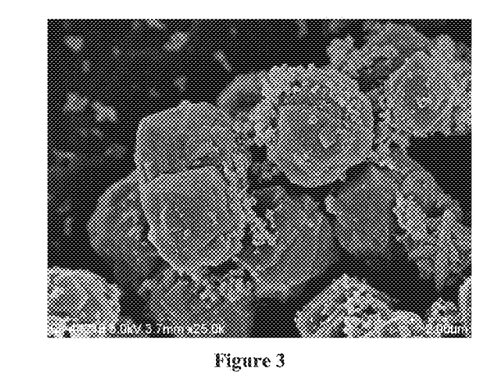
FIG. 3 shows a scanning electron microscope (SEM) image of a non-aggregated NaY sample prepared according to Example 3.

The mixture was first aged at room temperature (about 20-25° C.) for about 24 hours, while stirring at ~250 rpm. Then, the aged mixture was reacted at ~158° F. (~70° C.) in a ~2-liter autoclave, while stirring at ~250 rpm, for ~120 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of typically Y non-aggregated crystal morphology, as shown in FIG. 3. The as-synthesized Meso-Y crystals had a $SiO_2/Al_2O_3$ molar ratio of ~4.64 and a unit cell size (UCS) of approximately 24.63 Angstroms.

Example 4

High-Solids Preparation of Aggregated NaY (Meso-Y) Crystals (vs. Example 3)

A mixture was prepared from ~800 grams of water, ~258 grams of Ultrasil silica, 96 g of sodium aluminate solution (45%), and 210 g of 50% sodium hydroxide solution. The mixture had the following molar composition:

| | |
|---|---|
| $SiO_2/Al_2O_3$ | ~16.2 |
| $H_2O/SiO_2$ | ~14.1 |
| $OH^-/SiO_2$ | ~0.82 |
| $Na^+/SiO_2$ | ~0.82 |

Figure 4:
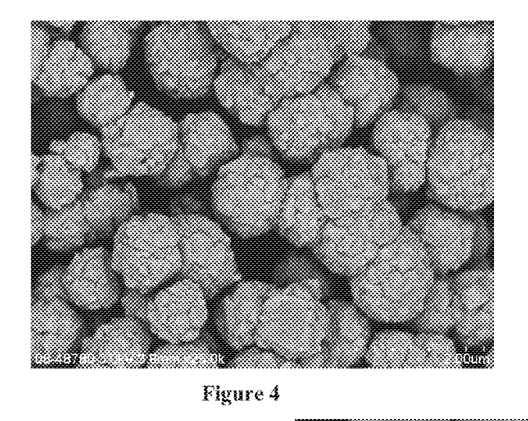
FIG. 4 shows a scanning electron microscope (SEM) image of a highly aggregated NaY sample prepared according to Example 4.

The mixture was first aged at room temperature (about 20-25° C.) for about 24 hours, while stirring at ~250 rpm. Then, the aged mixture was reacted at ~158° F. (~70° C.) in a ~2-liter autoclave, while stirring at ~250 rpm, for ~192 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of aggregates of small crystals, as shown in FIG. 4. The as-synthesized Meso-Y crystals had a $SiO_2/Al_2O_3$ molar ratio of ~4.7 and a unit cell size (UCS) of approximately 24.68 Angstroms. A portion of the as-synthesized crystals were dried at ~250° F. (~120° C.) and then further calcined at ~540° C. for about 2-4 hours in air, without ion-exchanging. These calcined crystals showed total surface area of about 911 $m^2/g$, which included about 20 $m^2/g$ of external surface area (compared to less than 10 $m^2/g$ for conventional Na—Y preparations). In addition, another portion of the as-synthesized crystals were first ion-exchanged using ~1N ammonium nitrate solution (in water) at room temperature to reduce sodium levels down to ~2%, and were then calcined at various temperatures (~600° C., ~700° C., ~800° C., ~900° C., and ~1000° C.) in air for about 2-4 hours to stabilize their structures. Properties of those resulting products are shown in Table 1 below.

TABLE 1

Properties of partially-exchanged calcined Meso-Y from Example 4

| Calcination Temperature | Surface Area [m²/g] (micro + external) | Alpha Value |
|---|---|---|
| ~600° C. | ~801/(~774 + ~27) | ~9.4 |
| ~700° C. | ~762/(~737 + ~25) | ~4 |
| ~800° C. | ~847/(~813 + ~34) | ~5.4 |
| ~900° C. | ~585(~535 + ~52) | ~0.85 |
| ~1000° C. | <~1 | N/A |

Alpha Value is an approximate indication of the catalytic cracking activity of the catalyst compared to a standard catalyst, and it gives the relative rate constant (rate of normal hexane conversion per volume of catalyst per unit time). It is based on the activity of silica-alumina cracking catalyst taken as an Alpha of 1 (Rate Constant≈0.016 sec$^{-1}$). The test for Alpha Value is described in U.S. Pat. No. 3,354,078 and in the *Journal of Catalysis* at 4, 527 (1965); 6, 278 (1966); and 61, 395 (1980), each incorporated herein by reference as to the relevant description. The experimental conditions of the Alpha Value test used herein include a constant temperature of about 538° C. and a variable flow rate as described in detail in the 1980 reference.

Example 5

Preparation of Aggregated NaY (Meso-Y) Crystals

A mixture was prepared from ~830 grams of water, ~258 grams of Ultrasil® silica, ~96 grams of sodium aluminate solution (45% in water), and ~180 g of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 5:
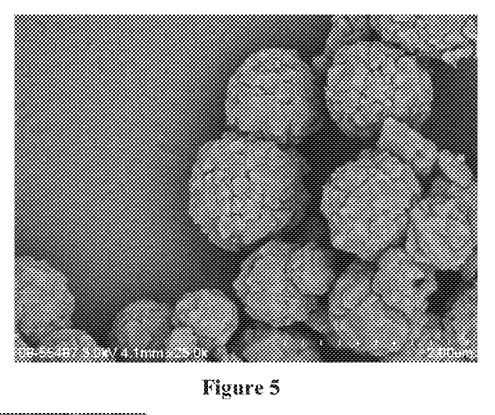
FIG. 5 shows a scanning electron microscope (SEM) image of a highly aggregated NaY sample prepared according to Example 5.

The mixture was first aged at room temperature (about 20-25° C.) for about 24 hours, while stirring at ~250 rpm. Then, the aged mixture was reacted at ~158° F. (~70° C.) in a ~2-liter autoclave, while stirring at ~250 rpm, for ~192 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of aggregates (~1 micron) of small crystals, as shown in FIG. 5. The as-synthesized Meso-Y crystals had a $SiO_2/Al_2O_3$ molar ratio of ~5.6 and a unit cell size (UCS) of approximately 24.65 Angstroms. The as-synthesized crystals were ion-exchanged with ~1N ammonium nitrate solution (in water) at room temperature to reduce sodium levels down to ~2%, and were then calcined at various temperatures (~600° C. and ~800° C.) in air for about 24 hours to stabilize their structures. Properties of those resulting products are shown in Table 2 below.

TABLE 2

Properties of partially-exchanged calcined Meso-Y from Example 5

| Calcination Temperature | Surface Area [m²/g] (micro + external SA) | Alpha Value |
|---|---|---|
| ~600° C. | ~840/(~814 + ~25) | ~26 |
| ~800° C. | ~835/(~794 + ~41) | ~5.4 |

Example 6

Preparation of Aggregated NaY (Meso-Y) Crystals

A mixture was prepared from ~830 grams of water, ~258 grams of Ultrasil® silica, ~96 grams of sodium aluminate solution (45% in water), and ~180 grams of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 6:
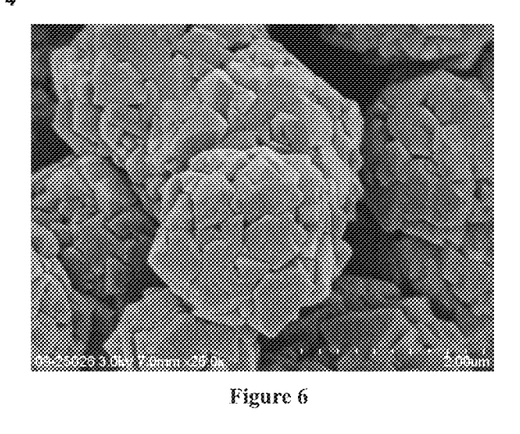
FIG. 6 shows a scanning electron microscope (SEM) image of a highly aggregated NaY sample prepared according to Example 6.
Figure 7A:
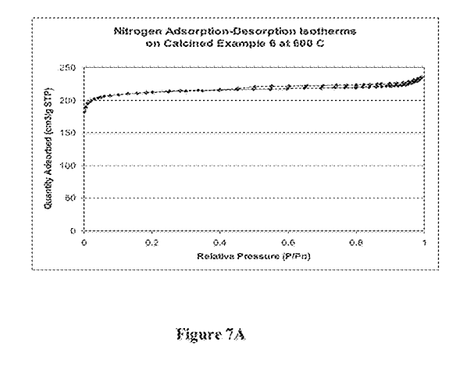
FIGS. 7A & 7B depict adsorption-desorption isotherms and pore size distributions from BJH Desorption of $N_2$ BET analysis of a sample calcined at about 600° C., as described in Example 6.
Figure 7B:
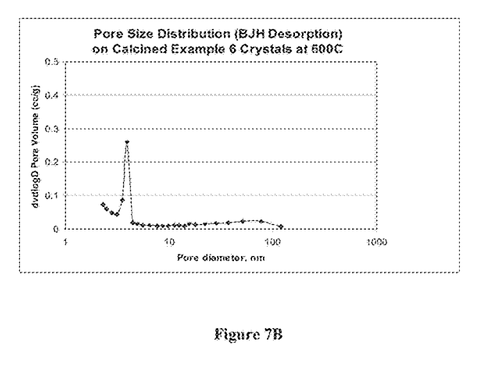

The mixture was first aged at room temperature (about 20-25° C.) for about 24 hours, while stirring at ~250 rpm. Then, the aged mixture was reacted at ~200° F. (~93° C.) in a ~2-liter autoclave under static conditions for ~120 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of aggregates of small crystals with an aggregate (i.e., secondary) particle size of ~2 microns, as shown in FIG. 6, which is larger than the secondary particle size of the product of Example 5. The as-synthesized Y crystals had a $SiO_2/Al_2O_3$ molar ratio of ~5.5. FIGS. 7A and 7B show nitrogen adsorption-desorption isotherms and pore size distributions from BJH desorption of $N_2$ BET analysis of a sample of the product after calcination at about 600° C. These plots indicate the presence of existing mesoporosity in the highly aggregated calcined product before any steam treatment step.

Example 7

Preparation of Aggregated NaY (Meso-Y) Crystals (~10× Scale-Up of Example 6)

A mixture was prepared from ~8.3 kilograms of water, ~2.58 kilograms of Ultrasil® silica, ~960 grams of sodium aluminate solution (45% in water), and ~1.8 kilograms of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 8:
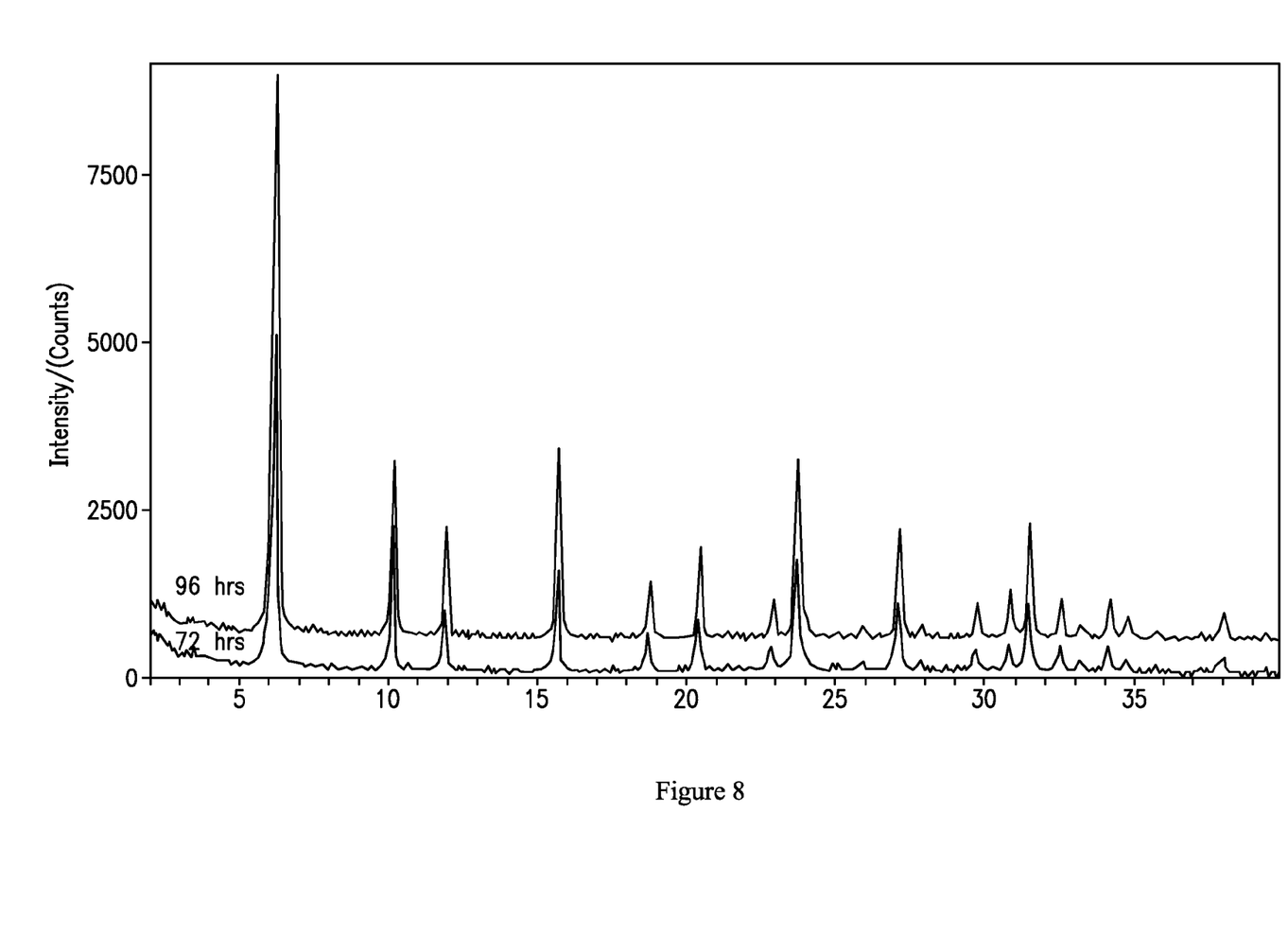
FIG. 8 shows XRD patterns of samples prepared according to Example 7.

The mixture was first aged at room temperature (about 20-25° C.) for about 24 hours, while stirring at ~250 rpm. Then, the aged mixture was reacted at ~200° F. (~93° C.) in a ~5-gallon autoclave under static conditions for ~96 more hours. The product was filtered, washed with deionized (DI) water, and dried at ~250° F. (~120° C.). The X-ray diffraction (XRD) patterns, as shown in FIG. 8, of as-synthesized product samples taken at ~72 hours and at ~96 hours showed the typical pure phase of zeolite Y crystal topology. Reaction appeared to be complete at less than ~96 hours. The resulting as-synthesized product crystals had a $SiO_2/Al_2O_3$ molar ratio of ~5.5.

FIGS. 4-6 provide a perspective of secondary particles composed of primary crystallites in an aggregated form. The primary crystallites have an average size/width (i.e., a cross-sectional dimension in the plane of the SEM image) of ~0.3 micron or less. The depth (i.e., dimension perpendicular to the plane of the SEM image) of the primary crystallites was not readily quantifiable. The details of the interior regions of each secondary particle were also not readily observable from the SEM images. However, it can be observed that the average size of at least 80% (by number) of the secondary particles was about 0.8 micron or more. At least 5 primary crystallites were observable by SEM in at least 80% of the secondary particles. Also, the ratio of the average size of the secondary particles to the average size of the primary crystallites was at least 5:1 in at least 80% of the secondary particles.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A highly aggregated form of zeolite Y comprising small size primary crystallites of zeolite Y, wherein at least 80% of the primary crystallites are aggregated to form secondary particles having an external surface, wherein the zeolite exhibits a silica to alumina molar ratio of 4:1 or more, wherein an average size of the secondary particles, as viewed from the external surface of the secondary particles, is about 0.8 micron or more, and wherein at least one of the following conditions apply:
   (a) an average size of the primary crystallites in the secondary particles, as viewed from the external surface of the secondary particles, is about 0.5 micron or less;
   (b) at least 80% of the secondary particles comprise at least 5 primary crystallites; and
   (c) in at least 80% of the secondary particles, a ratio of the average size of the secondary particles to the average size of the primary crystallites is at least 3:1.

2. An aggregated form of zeolite Y according to claim 1, wherein the ratio of the average size of the secondary particles to the average size of the primary crystallites is at least 5:1, wherein the average size of the primary crystallites is about 0.3 micron or less, and wherein at least 90% of the primary crystallites are aggregated to form secondary particles.

3. An aggregated form of zeolite Y according to claim 1, wherein the average size of the secondary particles, as viewed from the external surface of the secondary particles, is about 1.0 micron or more.

4. An aggregated form of zeolite Y according to claim 1, wherein said secondary particles are essentially spherical in shape.

5. An aggregated form of zeolite Y according to claim 1, wherein at least 80% of said secondary particles have an aspect ratio between 0.7 and 1.

6. An aggregated form of zeolite Y according to claim 1, wherein the secondary particles have an external surface area of about 10 $m^2/g$ or more.

7. An aggregated form of zeolite Y according to claim 1, wherein the secondary particles have an external surface area of about 20 $m^2/g$ or more.

8. An aggregated form of zeolite Y according to claim 1, wherein the secondary particles have central regions and edge regions, and wherein the central regions are less dense than the edge regions, as measured by SEM or TEM.

9. An aggregated form of zeolite Y according to claim 1, wherein Si/Al ratios throughout the secondary particles are approximately uniform, as measured by elemental mapping.

10. An aggregated form of zeolite Y according to claim 1, wherein said zeolite Y exhibits a silica to alumina ratio of at least 5:1.

11. An aggregated form of zeolite Y according to claim 1, further comprising at least one hydrogenating metal component.

12. An aggregated form of zeolite Y according to claim 1, having a mesopore volume of at least about 0.03 cc/g.

13. An aggregated form of zeolite Y according to claim 1, wherein said zeolite Y has a unit cell size of about 25 Angstroms or less.

14. An aggregated form of zeolite Y according to claim 1, wherein said zeolite Y is prepared from a reaction mixture in which a sodium silicate solution is used as a source of silica.

15. An aggregated form of zeolite Y according to claim 1, wherein said zeolite Y is prepared from a reaction mixture in which a precipitated silica powder is used as a source of silica.

16. A method for making an aggregated form of zeolite Y according to claim 1, said method comprising forming a reaction mixture capable of forming said aggregated form of zeolite Y and maintaining said reaction mixture under conditions sufficient to form said aggregated form of zeolite Y, wherein said reaction mixture comprises sources of $SiO_2$, $Al_2O_3$, $Na^+$, $OH^-$, and $H_2O$, and wherein said reaction mixture comprises an $Si/Al_2$ molar ratio of about 10 or more, an $H_2O/Si$ molar ratio of about 15 or less, and an $OH^-/Si$ molar ratio of about 0.85 or less.

17. A method according to claim 15, wherein said reaction mixture comprises a $SiO_2/Al_2O_3$ molar ratio from about 10 to about 20, an $H_2O/SiO_2$ molar ratio from about 10 to about 20, an $OH^-/SiO_2$ molar ratio from about 0.5 to about 1.0, and a $Na^+/SiO_2$ molar ratio from about 0.5 to about 1.0.

* * * * *